United States Patent [19]

Cooper

[11] Patent Number: 5,459,524
[45] Date of Patent: Oct. 17, 1995

[54] PHASE MODULATION DEMODULATOR APPARATUS AND METHOD

[76] Inventor: J. Carl Cooper, 15288 Via Pinto, Monte Sereno, Calif. 95030

[21] Appl. No.: 351,722

[22] Filed: Nov. 18, 1994

Related U.S. Application Data

[63] Continuation of Ser. No. 792,725, Nov. 18, 1991, abandoned.

[51] Int. Cl.[6] .............................. H04N 9/45; H04N 9/455
[52] U.S. Cl. ........................ 348/507; 348/508; 348/498; 348/539; 348/639
[58] Field of Search .................... 348/497–498, 348/505–509, 536, 537, 539, 549, 638, 639, 641; 358/320, 323, 324, 325, 326; H04N 9/45, 9/455

[56] References Cited

U.S. PATENT DOCUMENTS

| | | | |
|---|---|---|---|
| 4,121,243 | 10/1978 | Yamaguchi et al. | 358/25 |
| 4,170,023 | 10/1979 | Yamakoshi et al. | 358/27 |
| 4,404,583 | 9/1983 | Tatami | 348/539 |
| 4,611,240 | 9/1986 | Harwood | 358/23 |
| 4,675,724 | 6/1987 | Wagner | 358/19 |
| 4,736,237 | 4/1988 | Fling et al. | 358/23 |
| 4,797,730 | 1/1989 | Smith | 358/326 |
| 4,797,732 | 1/1989 | Aketagawa et al. | 358/23 |
| 4,799,102 | 1/1989 | Kobayashi | 358/23 |
| 4,847,678 | 7/1989 | McCauley | 358/326 |
| 4,862,099 | 8/1989 | Nakai et al. | 358/23 |
| 4,989,073 | 1/1991 | Wagner | 358/19 |
| 5,043,799 | 8/1991 | Kohiyama et al. | 358/19 |
| 5,062,005 | 10/1991 | Kitaura et al. | 358/320 |
| 5,396,294 | 3/1995 | Fuji et al. | 348/505 |

*Primary Examiner*—James J. Groody
*Assistant Examiner*—Michael H. Lee

[57] ABSTRACT

This invention is for a reference generator and demodulator for recovering information which has been phase, modulated on (or encoded on) a carrier. The inventive concepts described herein include a novel reference measurement circuit including a sampler and phase measurement circuit to measure the carrier reference's phase and/or frequency relative to a discrete time sampling phase and frequency, and a demodulator reference signal generator to generate properly phased reference signals for use by the phase demodulator circuit. The invention is particularly useful for decoding chroma difference signals of PAL and NTSC television video signals. It is suited to be implemented in digital form, operating on digitized signals thereby deriving all of the benefits normally expected of digital signal processing, including precision, freedom from drift and freedom from alignment. The invention is also particularly well suited to implementation by integrated circuit.

47 Claims, 7 Drawing Sheets

PRIOR ART ANALOG R-Y, B-Y CHROMA DECODER

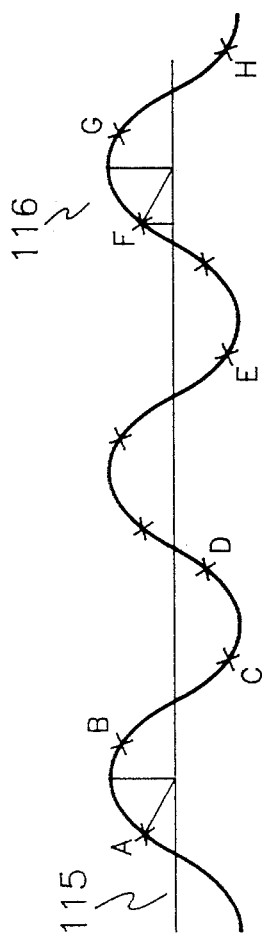
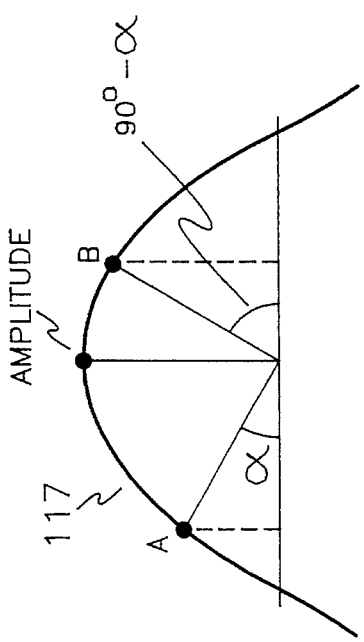
VALUE A = SIN $\alpha$ · AMPLITUDE
$\therefore \frac{A}{AMPLITUDE} = \sin \alpha$
VALUE B = SIN $(90° - \alpha)$ · AMPLITUDE = COS $\alpha$ · AMPLITUDE
$\therefore \frac{B}{AMPLITUDE} = \cos \alpha$
$\frac{\sin \alpha}{\cos \alpha} = \frac{\frac{A}{AMP}}{\frac{B}{AMP}} = \tan \alpha$
$\therefore \tan \alpha = \frac{A}{B}$
$\tan \alpha = \log^{-1}(\log A - \log B)$
FIGURE 6

PHASE MODULATION DEMODULATOR APPARATUS AND METHOD

This application is a continuation of application Ser. No. 07/792,725, filed Nov. 18, 1991, now abandoned.

BACKGROUND OF THE INVENTION

1. Field of the Invention

The present invention relates to the field of phase and amplitude modulating and demodulating carriers and subcarriers, and in particular to the modulating and demodulating of PAL and NTSC video chroma signals and the like which are carried on a quadrature (as well as other angle) phase and amplitude modulated subcarrier in the video signal.

2. Description of the Prior Art

The prior art contains many circuits for performing modulating and demodulating in phase modulation systems. A typical chroma demodulator is shown in FIG. 1 which shows a composite video input 1 from which composite video is coupled to Band Pass Filter (BPF) 2 which passes the chroma subcarrier of the video 5, sync separator 3 which provides a burst flag signal (BF) 6 in response to the video sync, and low pass filter (LPF) 4 which passes the luminance (Y) portion 7 of the video signal. A phase locked loop (PLL) 8 receives the chroma 5 and burst flag 6 and phase locks an oscillator to the reference chroma burst of signal 5, providing continuous chroma reference signals in quadrature 9 and 10. The quadrature reference signals 9 and 10 are multiplied with the chroma signal in multipliers 11 and 12, respectively, to effect the phase demodulation of the subcarrier. The resultant signals are low pass filtered (LPF) by 13 and 14 to remove the subcarrier and harmonic signals from the demodulated signals which in this example are Red-Luminance (R-Y) 15 and Blue-Luminance (B-Y) 16.

Other demodulation angles have been used, such as I and Q, however in this prior art example, R-Y and B-Y is assumed. The R-Y and B-Y signals are then passed, along with the Y signal, to the color matrix 23 where the RED (R) 19, GREEN (G) 20 and BLUE (B) 22 signals are derived by combining elements 17, 18 and 21, respectively. This type of prior art chroma demodulator is widely used and works fairly well, however due to its analog nature it requires alignment and precision components to achieve any moderate degree of performance. In addition, the PLL must be a crystal type, if it is to be relatively low in cost, or must be a very complex sync and burst locked circuit such as described in U.S. Pat. No. 4,026,041. The circuit does not lend itself to implementation in digital form, mainly due to the complexities of implementing a suitable VCO and PLL 8 to generate the quadrature reference signals 9 and 10.

FIG. 2 shows another prior art demodulator embodiment having BPF 24 corresponding to 2 of FIG. 1 to provide chroma 27, PLL 30 of the type described in U.S. Pat. No. 4,026,041 responsive to furst flag 28 from sync separator 25 for generating a sampling clock 31 which is phase locked to the color burst, which sampling clock is coupled to an A-D convertor 26 which digitizes the composite video input to provide a digitized video stream 29, shown to be a single line connection, however one skilled in the art will understand that the single line connection as well as the single element circuits which are shown herein represent multiple digital elements and connections. Digital video 29 also connects to FIR BPF (Finite Impulse Response Band Pass Filter) 33 corresponding functionally to 24 and to 2 of FIG. 1, FIR LPF 34 corresponding to 4 of FIG. 1 to provide Luma 30, FIR BPFs 38 and 39 corresponding to 13 and 14 of FIG. 1 and providing R-Y 40 and B-Y 41, and Matrix 42 corresponding to 23 of FIG. 1. In this prior art example, since the sampling clock is phase locked to the color burst of the video signal, and the frequency is chosen to be 4 times the subcarrier frequency, the four samples per subcarrier cycle then correspond to the four quadrature phases of the reference subcarrier. The sampling clock may then be divided by 2 by element 32 and coupled to a suitable switch 37 to alternately apply the digital chroma samples (with appropriate polarity inversion by the switch) to the color difference low pass filters 38 and 39. This system is fairly complex by virtue of the stringent phase locking requirement of the sampling clock which is placed on 30. The system is not suitable for use in heterodyne color systems such as used in home video recorders. In heterodyne color systems, the color subcarrier frequency is not phase locked to the video sync horizontal frequency. In order to perform any digital video processing, such as image manipulation, it is desirable to have the sampling clock phase locked to the horizontal sync. Since in heterodyne color systems the color subcarrier is not phase or frequency locked to sync, it is not possible to have the sampling clock 31 phase or frequency locked to both sync and color burst by 30.

FIG. 3 shows yet another prior art chroma demodulator which utilizes an A-D 44 to digitize composite video 43 providing digitized video 45 corresponding to 26, 1 and 29, respectively of FIG. 2, BPF 46 providing digital chroma 50 corresponding to 33 and 35 of FIG. 2, LPF 48 providing Y signal 54 to Matrix 66 corresponding to 34, 36, and 42 of FIG. 2, and color difference LPFs 62 and 63 corresponding to 38 and 39 of FIG. 2. Additionally, FIG. 3 shows a digital sync separator 47 which provides H sync 52 to a digital PLL 49 which generates an H locked sampling clock 53 which the A-D 44 utilizes for sampling the video. Element 7 also provides BF 51 which is coupled to a second digital PLL 55 to provide digital quadrature reference signals 56 and 57 in response to chroma subcarrier reference burst of 50, which reference signals are multiplied with chroma 50 in multipliers 58 and 59 to provide the R-Y and B-Y signals 60 and 61 which are coupled to 62 and 63 providing filtered R-Y 64 and B-Y 65. This prior art circuit overcomes the problem of operating with heterodyne color but at the expense of a second PLL 55 which adds to the expense of the circuit which is already impacted by the first digital PLL 49. In addition, it is difficult to achieve an accurate phase lock with PLL 55, which is most commonly implemented with a crystal oscillator at some high frequency, usually around 30 MHz, and a numerically controlled oscillator (NCO). The NCO requires a fairly large accumulator in order to achieve phase lock accuracies which typically need to be within 1°.

SUMMARY OF THE INVENTION

This invention includes a novel reference measurement circuit which samples and measures the carrier reference's phase and/or frequency relative to the discrete time sampling. The invention includes a demodulator reference signal generator to generate properly phased reference signals in response to the sampling to carrier reference phase and frequency. The reference signals are for use by a phase demodulator circuit. Novel methods of computing the sampling to carrier reference phase, generating the reference signals, demodulating the modulated carrier and filtering the demodulated signals are also shown. The invention is particularly useful for decoding chroma difference signals of PAL and NTSC television video signals.

BRIEF DESCRIPTION OF THE DRAWINGS

FIG. 6 shows a trigonometric relationship of color burst and sample points.

FIG. 8 shows a digital demodulator using logarithm type processing circuits.

FIG. 9 shows a digital finite impulse filter using logarithm type processing circuits.

FIG. 10 shows a digital embodiment of 97 of FIG. 4.

DESCRIPTION OF THE PREFERRED EMBODIMENT

Figure 1:
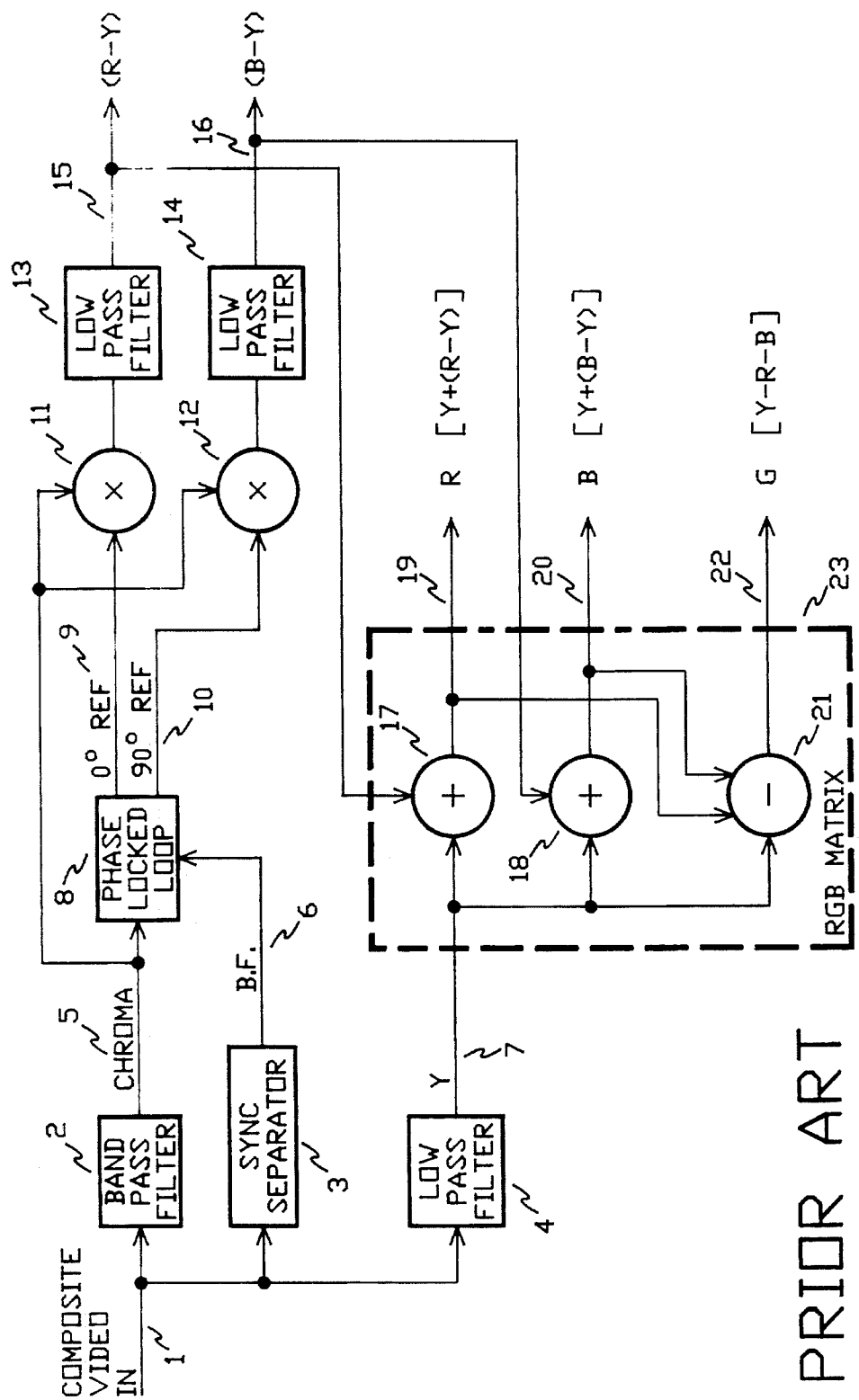
FIG. 1 shows a prior art analog R-Y, B-Y chroma demodulator and PLL with RGB matrix.

The description of the preferred embodiment of the present invention is given as used for a chroma decoder for NTSC like color signals. The terms sample and pixel , encode and modulate, decode and demodulate, as well as burst and reference, subcarrier and carrier are used somewhat interchangeably in the present description, as is typical in the video art. One skilled in the art will recognize from the descriptions and teachings herein, taken in conjunction with the drawings and claims, that the inventive concepts will apply equally well for operations with other types of signal demodulation etc., for other industries and technologies. It will be understood that other arts will use different terminology than that used for the description herein, which may apply to other arts without respect to the particular terminology used in the particular art. For example, this invention could be used for digital modem circuitry which decodes digital data on phase and amplitude encoded carriers used for transmission over analog channels such as telephone circuits, microwave links, radio frequency communications and satellite transponders.

In the present disclosure, the particular term which is conventionally used in the present video related technology or art, is intended to imply and include the functional equivalent which may be identified by a different terminology in the same or different technology.

The invention described herein is practiced using basic functional components such as adders, subtracters, accumulators, registers, logic elements, look up tables and filters. The description of the preferred embodiment is given for digital circuitry, however one skilled in the art will recognize from the teachings that the invention may also be practiced utilizing analog circuits. In addition, it is believed that one skilled in the art will be quite capable of selecting appropriate integrated circuits, or of designing such functional components from circuits and components which are readily available. In particular, integrated circuits which are manufactured by Analog Devices, Norwood, Mass., Brooktree, San Diego, Calif., TRW Inc. of La Jolla, Calif., Integrated Device Technology, Santa Clara, Calif., and Motorola, Austin, Tex. may be used, and one is referred to application notes, technical specifications and other literature which is available from these manufacturers.

Particulars of implementation of digital video related filters, PLLs, Sampling, A–D conversion, as well as descriptions and teachings of the basic circuit elements found herein may be found in a number of reference materials. In particular, the *Society of Motion Picture and Television Engineers Journal* and *D·I·G·I·T·L Television* edited by C. P. Sandbank, published by John Wiley & Sons, New York, N.Y. 10158 are especially good sources.

In the drawings and descriptions of the various embodiments of the invention given herein, it is assumed that those reading the disclosure are skilled in the art and will appreciate the details of construction from the drawings and descriptions given. In particular, as is common in the art, detailed information, for example polarities, signs of combination in adders or multipliers, phases of combined signals, etc. will not be shown, as one skilled in the art will recognize and provide for such detail in practicing the present invention. For example, in FIG. 3, element 21 is shown as simply a "-" block. One skilled in the art will realize from the teachings herein, that this block is intended to subtract the R signal and subtract the B signal from the Y signal.

Figure 2:
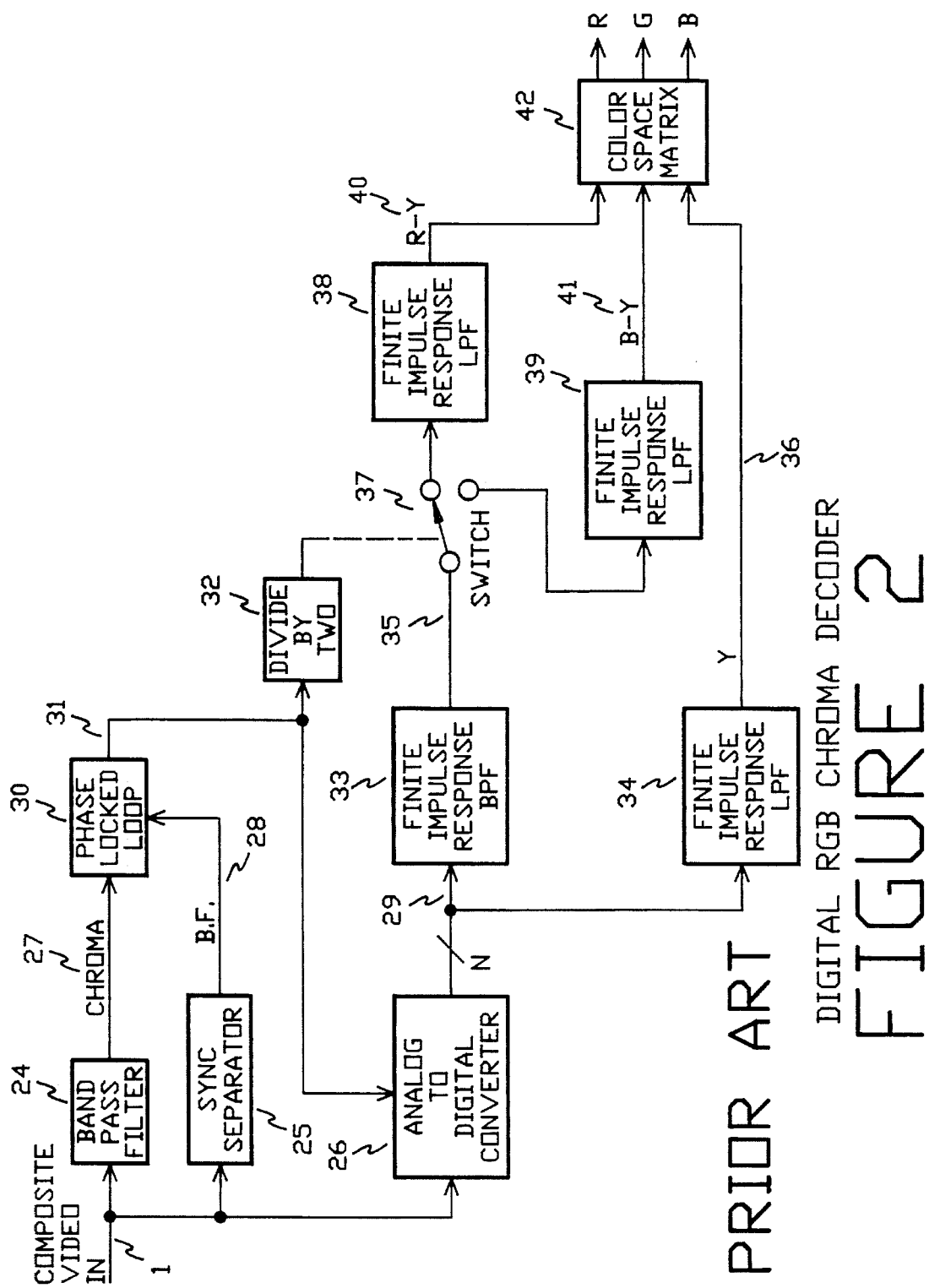
FIG. 2 shows a prior art digital RGB chroma demodulator with an analog PLL.
Figure 3:
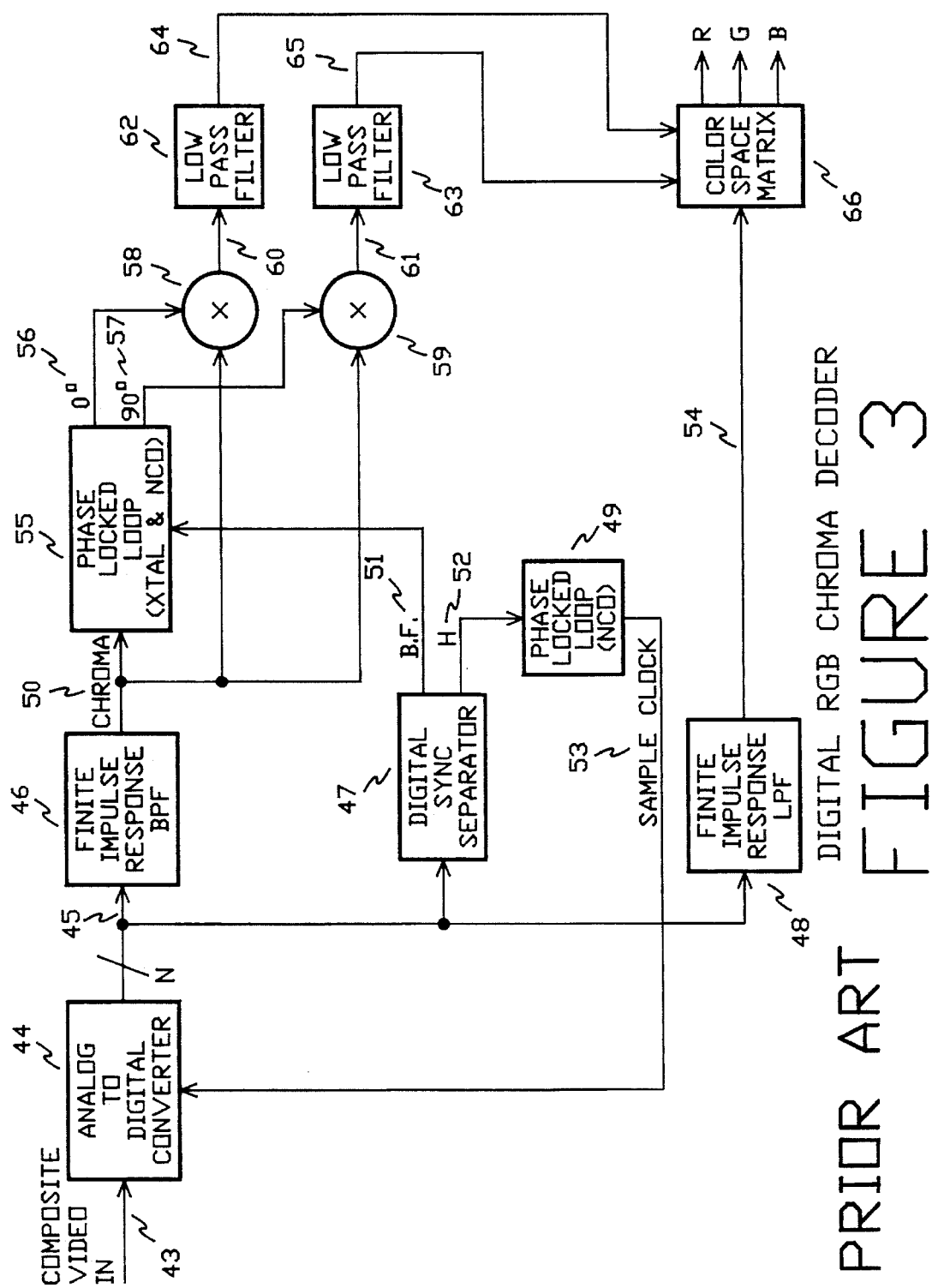
FIG. 3 shows a prior art digital RGB chroma demodulator with a digital PLL.

FIGS. 1–3 show prior art versions of chroma decoders as discussed above.

Figure 4:
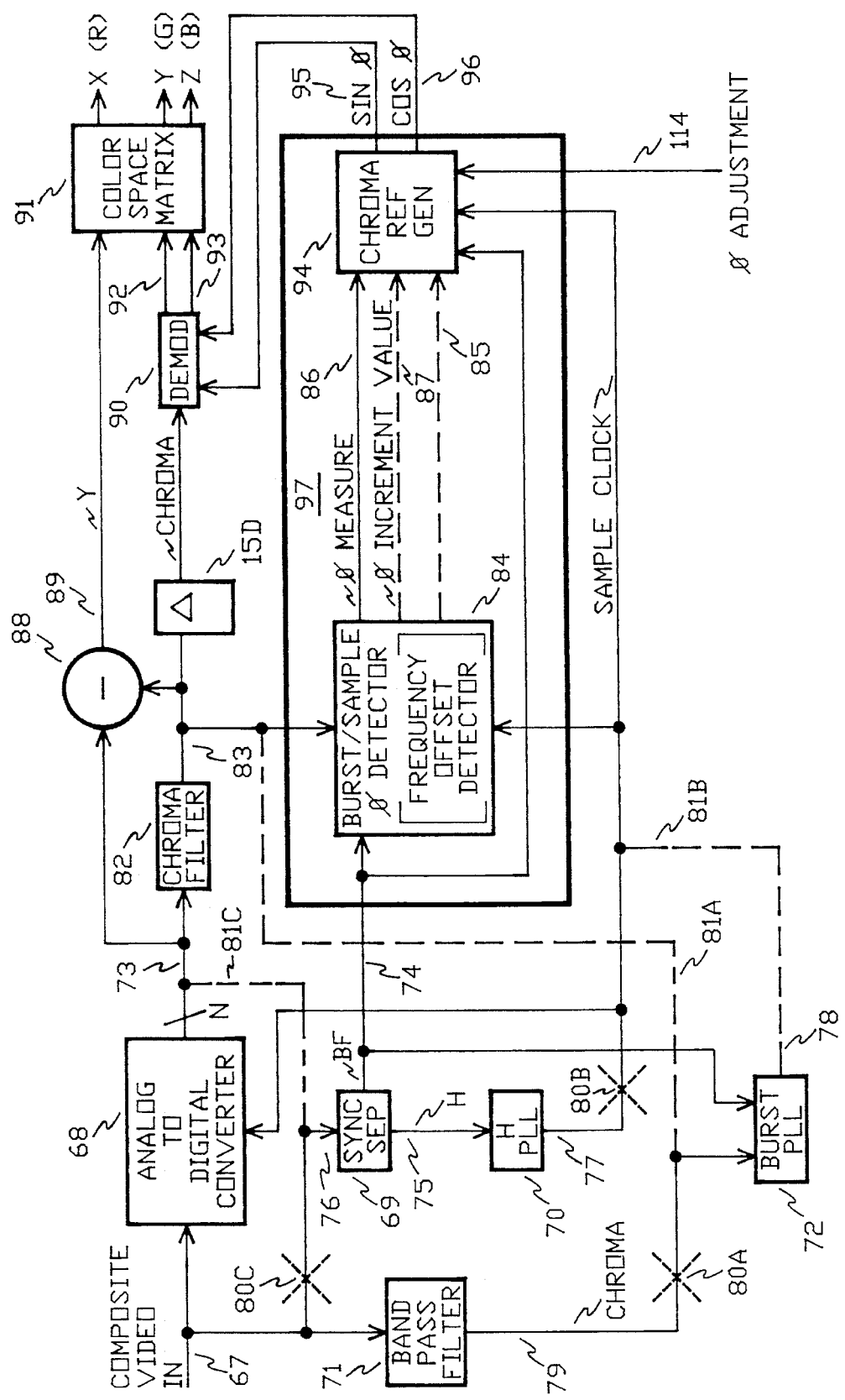
FIG. 4 shows a first embodiment of the invention.

FIG. 4 shows a first embodiment of the present invention for providing three color outputs from a composite video input 67. The preferred connection of elements is shown in solid lines, with other embodiments which are reasonably expected to be of commercial value shown by dashed lines. In the preferred embodiment, a sync separator 69 having input 76 responsive to input video 67 provides a Burst flag signal (BF) 74 and a Horizontal sync signal 75 (H) both in response to the composite video sync as is well known in the art. An H locked PLL 70 generates a sample clock which is phase locked to H sync, which sample clock is utilized by A–D convertor 68 to sample input video 67 thereby providing digitized composite video 73 which in the preferred embodiment is an 8 bit digital signal as is well known in the art. The Brooktree Corp. sells a module, the AD9502, which performs the functions of 68, 69, and 70, receiving a video input and providing a clock and digitized video out. The 8 bit digital video 73 will be shown as a single line for clarity, however it will be understood that this and other parallel digital signals are to be suitably coupled as represented by single line connections and single element components.

Alternatively, a burst locked PLL 72, responsive to BF 74 and Chroma 79, such as described in U.S. Pat. No. 4,062,041, could be used to generate the sampling clock 77, however as will be appreciated from the present disclosure such is not necessary and would incur additional expense. The burst PLL would be incorporated by making alternate connections 81A and 81B in place of connections 80A and 80B. Further, it will also be appreciated that a free running, or gated free running sampling clock may also be utilized, however this is not as desirable as the suggested H locked sampling clock.

For the purpose of the present example, and as chosen for the preferred embodiment, the sampling clock 77 is phase locked to horizontal at a frequency which is chosen to be nominally 4 times the color subcarrier frequency. Other frequencies may be used as well, however this relationship finds considerable acceptance as a standard. For NTSC video, the sampling clock will be at a frequency of 910 H, or 14.3 MHz. For PAL, the sampling clock will be 1135 H or 17.7 MHz. Other frequencies and ratios may be utilize with minor changes to the circuitry to accommodate them as will be apparent to one skilled in the art from the present teachings. Alternatively, the sync separator 69 may be coupled to digitized video 73 instead of analog video 67, by making connection 81C in place of 80C, and a burst PLL 72 may be utilized to generate a burst locked sampling clock 78 which is substituted for the H locked clock 77 via connection 81B, which burst PLL operates in response to chroma 79 from analog chroma BPF 71, or digital chroma 83 from digital chroma filter 82, and in further response to burst flag 74, all as is well known in the art.

The chroma demodulator of FIG. 4 contains digital chroma band pass filter 82 responsive to digital video 73 to provide digital chroma 83 which may optionally be delayed by delay 15D, subtracter 88 to subtract digital chroma 83 in either direct or optional delayed form from digital composite video 73 to provide digital luma (Y) 89. Such filters are well known in the art, such as that described in U.S. Pat. No. 4,803,547. The Motorola MC141620 is also suitable for low performance analog consumer applications. Demodulator 90 containing multipliers and low pass filters corresponding to 58, 59, 62 and 63 of FIG. 3, is responsive to digital chroma 83 and reference signals 95 and 96 to provide demodulated difference signals 92 and 93 as is well known in the art, with FIG. 4 further containing matrix 91 similar in function to 66 of FIG. 3. The Brooktree BT281 is one such matrix which is suitable for this operation.

FIG. 4 further shows a novel chroma reference generating means 97 responsive to burst flag 74, sample clock 77, digital chroma 83 (of which only the reference burst is used), optional phase adjustment 114 and providing a plurality of reference outputs 95 and 96, which in the present example and preferred embodiment are chosen as SIN $\phi$ and COS $\phi$ where $\phi$ is the color burst phase from color burst of 83 offset by the amount of phase adjustment 114 (if any). Demodulator 90 will then output color difference signals 92 and 93 such as I and Q or R-Y or B-Y depending on the setting of 114, which may also be used as a tint control for NTSC signal demodulating. Novel chroma reference generating means 97 contains a burst to sample clock $\phi$ and frequency offset detector 84 which measures the relative burst to sampling clock phase for each color burst, and outputs this value 86, and additionally may measure the sample to sample burst $\phi$ increment (relative to burst) value which is output as 87. The $\phi$ measure 86 and $\phi$ increment 87 values are coupled to the chroma reference counter 94, along with sample clock 77, burst flag 74, and phase adjustment 114 and, as required, timing and control signals 85. For each sample of chroma 83, chroma reference generator 94 outputs the appropriate plurality of reference signal values 95 and 96 to enable the demodulator 90 to operate properly. More than two signals 95 and 96 may be output if needed. The Novel chroma reference generating means 97 has the particular advantage of operating without PLL's or NCO's and will operate to properly supply reference signals 95 and 96 with heterodyne chroma and H sync locked, or even free running or gated free running sampling which is one of the features of the present invention. For example, 97 could be utilized with a sampling clock generator such as described in U.S. Pat. No. 4,999,526.

Figure 5:
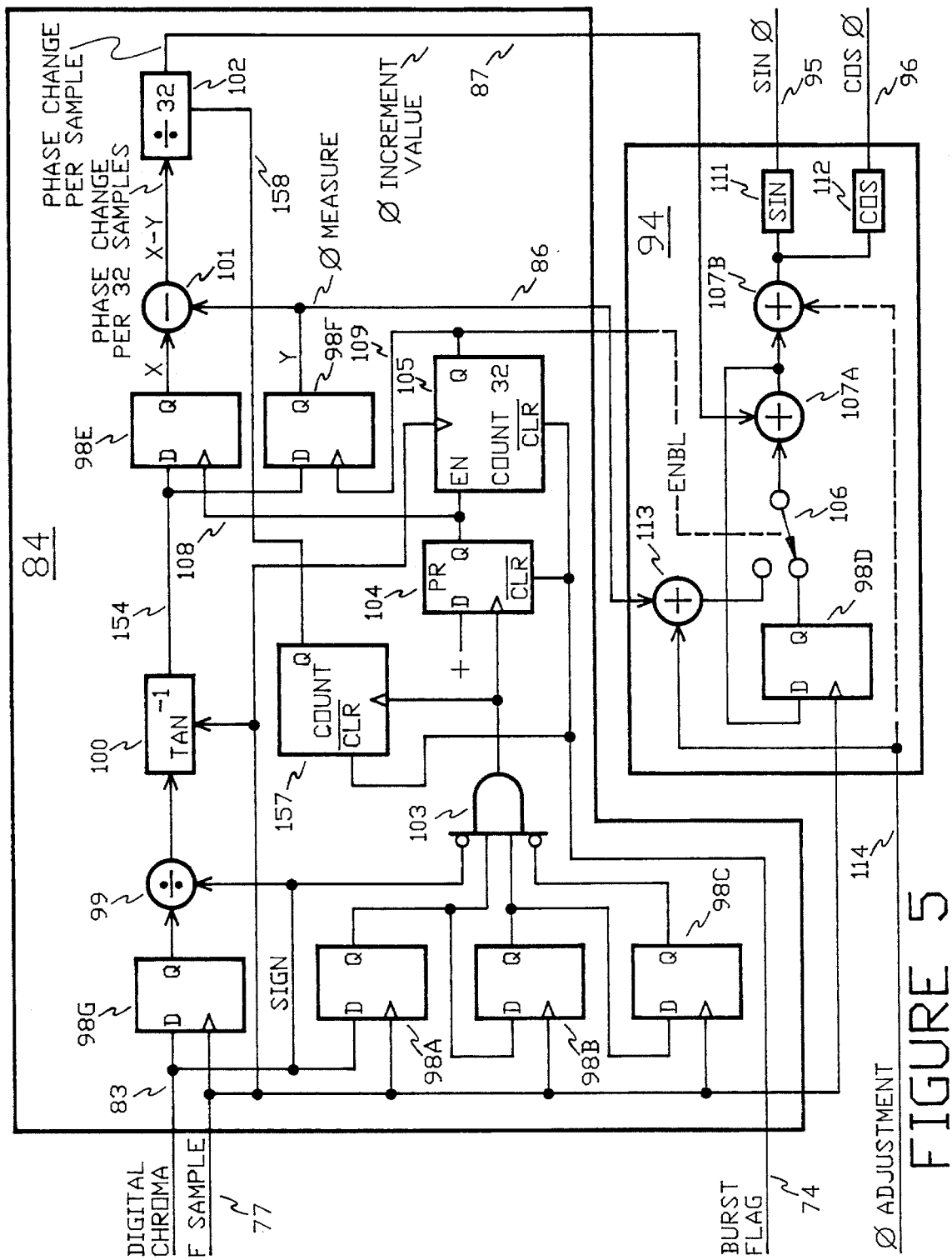
FIG. 5 shows a detailed diagram of 84 and 94 of FIG. 4.

FIG. 5 shows a detailed diagram of an embodiment of the novel chroma reference generating means 97 of FIG. 4, including 84 and 94 of FIG. 4. The sign bit of digital chroma 83 is coupled to one input of gate 103, and through the latches 98a, 98b, and 98c with the output of each latch also coupled to gate 103. The digital chroma 83 is coupled to latch 98g and to divider 99. The output of 98g is also coupled to divider 99. The output of divider 99, which represents the TANGENT of $\alpha$ which is the sampling to burst angle of the current sample, is coupled to the input of ARCTANGENT calculator 100. ARCTANGENT calculator 100 outputs the sampling angle $\alpha$ 154 which is coupled to the inputs of latches 98e and 98f. The output of 98e, X, is coupled to subtracter 101, and the output of 98b, Y, is coupled to subtracter 101 and is also output from 84 as the phase measure 86. The output of subtracter 101 is X-Y and represents the phase change of 8 cycles of burst over 32 samples. Circuit 102 is labeled as ÷32 for simplicity, however in 102 the value X-Y is added to 8·360° and the sum is divided by 32. Circuit 102 thus computes the value which represents the average burst phase change over each sample, and this is output from 84 as the sampling phase increment value 87. Note that the difference of values X and Y represent degrees of subcarrier deviation over 8 cycles of color burst subcarrier, therefore even if X-Y is zero, the divider 102 must recognize that 32 samples were made over 8·360° therefore the $\phi$ increment value 87 will be 90°, not 0°. That is why 102 divides by 32 samples per 8·360°. In the present example the value of [(X-Y)+(8·360°)]÷32 is added to 90° to yield the value 87. It should be noted that it is intended for the first and 32nd sample to both occur in the same slope half cycle of the burst, that is they both should be from the half cycle defined by the fourth and first quadrant, or from the second and third quadrant. If the frequency difference between the sampling and the burst is such that the 32nd sample does not occur in the same slope half cycle from the 8th burst cycle, the value of 8·360° and associated calculation must be modified accordingly to reflect the half cycle which the 32nd cycle occurs in. The number of half cycles is counted by 157 and coupled to 102 as 158.

Gate 103 which has as its inputs the sign of the previous 3 and current samples performs a subcarrier quadrature identification function. When the sample signs are in the sequence − + + −, 103 outputs a rising edge 108 which clocks latch 104. This rising edge identifies when the current sample is being made in a known quadrant corresponding to a known slope half cycle of the subcarrier. For applications where there may be a large frequency difference between the burst and the sampling, an adder 157 should be combined with the output of 103 to keep track of the number of like sloped half cycles 158 which are sampled during the 32 samples. Burst flag 74 is used to hold 104 clear, except during burst so that the output of 104 will go high at the time period when sample C of FIG. 6 is present at 85. This will allow the value of $\alpha$ for sample A to be latched into 98e. This value is the value of the first sample of the first positive half cycle of the color burst. Note that ARCTANGENT circuit 100 will contain a clock delay so that e is present at the input of 98e when 108 clocks 98e. Output 108 also enables 32 counter 105 which is held clear by BF except during the burst time. Counter 105 outputs a clock signal 109 32 counts into burst flag to clock the value of $\alpha$ corresponding to the first sample of the eighth positive burst cycle into latch 98f. The sample clock 77 is appropriately coupled to the various registers, latches, etc., in order to provide proper clocking.

The sample phase 86 and the sample to sample phase increment value 87, as well as the 32 counter output signal 109 are coupled to the reference generator circuit 94. Phase offset value 114 is added to 86 to offset that phase value by an amount suitable for changing the demodulation angle of the reference signals, or alternatively to adjust the tint of the demodulated signal as is common for NTSC demodulators.

The phase offset may also be adjusted at 107B as indicated by the dashed connections. Switch 106 is caused to select the adjusted phase value from 113 at the proper time to acquire the newly computed value in response to signal 109. At the next clock that value is incremented by the phase increment value 87 by the phase accumulator comprised of register 98D and adder 107A with the output of 98D coupled through 106 to 107A. Consequently, the incremented phase value from 107A will match each new sample's phase as that sample is present. The phase value for each sample is coupled to the SIN and COS look up tables 111 and 112, via 107B if used, where the proper SIN and COS value for each phase applied is output on 95 and 96. The reference signals 95 and 96 are coupled to the chroma demodulator 90 of FIG. 4, where they are multiplied with the modulated chroma subcarrier in order to demodulate the subcarrier into color difference signals 92 and 93.

FIG. 6 shows the trigonometric relationship as applied to color burst and sample points and which is used to explain the operation of the present invention. A typical color subcarrier burst sine wave is shown with sample points A through H indicated and further showing angular relationships 115 and 116. A detailed view of sample points A & B on half cycle 117 is shown. Trigonometric formulas relating the circuit operations of FIG. 5 are given with respect to the sample points A through H. Since the sample value of A is equal to the SIN of the sample angle $\alpha$ multiplied by the amplitude of the sine wave at that sample point, and sample value B correspondingly responds to COS $\alpha$, then the angle $\alpha$ can be computed from the sample values A and B independent of any overall amplitude gain change of the signal. The TANGENT of $\alpha$ is simply the ratio B/A which is computed by 99 and 98g as shown in FIG. 5. ARCTANGENT calculator 100 is used to arrive at the angle $\alpha$ from its TANGENT. In the preferred embodiment, 100 is simply a digital PROM or ROM which contains the appropriate angle for every possible TANGENT which can be provided with a number of digital bits output from 99 of FIG. 5, which in the preferred embodiment is 9 bits. The 9 bits of angle TANGENT gives 512 angle TANGENTS for 512 angles between 0° and 90° which achieves better than 1° resolution. Note that the 512 angles are not equally divided into 90°.

The angle of sampling on a cycle of the subcarrier reference signal is thus calculated for a known sample by trigonometrically operating on one or more pairs or a plurality of samples. The sample to sample phase change is also calculated. Reference signals are generated in response to the sample to sample phase change by incrementing the reference generator by the same phase change. The phase of the reference generator may be checked against the calculated phase for a known sample, and corrected accordingly if it is in error by a predetermined amount, or alternatively the calculated phase for a known sample can be substituted for the phase of the reference generator. As an additional feature of the present invention, the past history of the error between the calculated phase and the actual phase of the reference carrier can be used to predict the upcoming error with better accuracy. Further, in systems where the chroma frequency changes between color bursts, or where the sampling clock frequency is changing between color bursts, the burst to burst error can be used as a modulation factor, to frequency modulate the generation of the reference.

Figure 7:
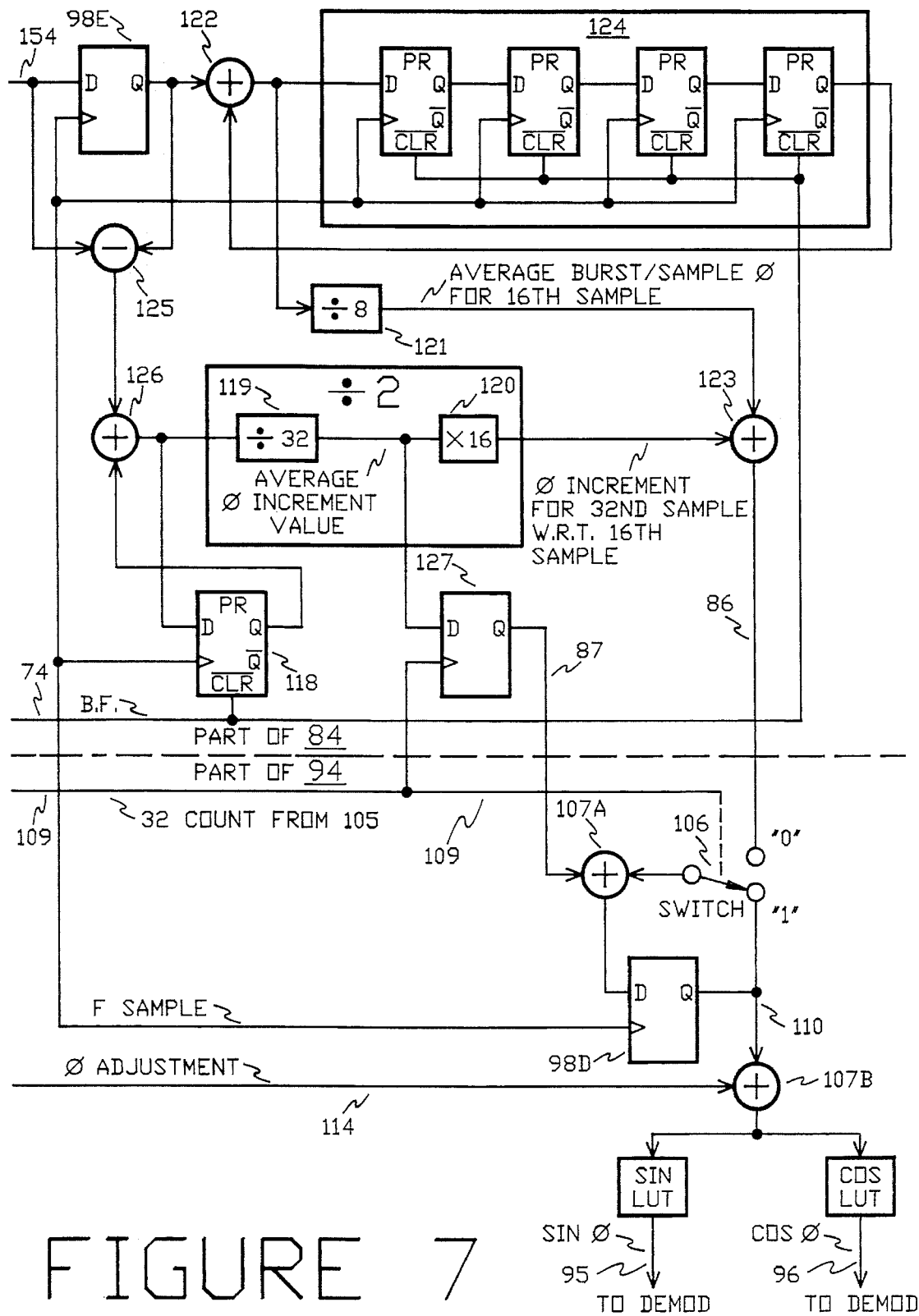
FIG. 7 shows a detailed diagram of parts of 84 and 94 of FIG. 4.

FIG. 7 shows a detailed diagram of parts of 84 and 94 of FIG. 4, which diagram includes improvements and alternate embodiments to 84 and 94 shown in FIG. 5. FIG. 7 shows a more accurate method of calculating the $\phi$ increment value 87 and the $\phi$ starting phase value 86 of FIGS. 4 and 5 as compared to the method of circuit elements 98b, 101 and 102 of FIG. 5. Elements 125, 126, 118, 119 and 127 of FIG. 7 therefore replace elements 101 and 102 of FIG. 5. Elements 120, 121, 122, 123 and 124 of FIG. 7 then replace 98f of FIG. 5.

FIG. 7 shows the measured sampling phase $\alpha$ 154 taken from 100 of FIG. 5, as input to 98e as in FIG. 5, but having new subtracter 125 to which $\alpha$ is also applied. The other input of 125 is the output of 98e which is $\alpha$ delayed by 1 clock, with the output of 125 being applied to an accumulator constructed of 126 and 118. The delayed $\alpha$ from 98e is also applied to the accumulator composed of 122 and 124. The first accumulator 126 and 118 is held clear by BF except during burst where the accumulator is allowed to accumulate 32 values of the difference of $\alpha$ from sample to sample. This accumulated total of the sample to sample differences is then divided by 32 in 119, thus becoming the average sample to sample $\phi$ increment value over the 33 samples (corresponding to 32 sample to sample differences), which are taken over the burst. After the 32 sample differences are accumulated and divided, this average value is latched in register 127 by the 32 count from counter 105 of FIG. 5.

The use of accumulation and divide calculates the average $\phi$ increment value and allows any errors from random noise or sampling phase jitter to be correspondingly reduced. This feature is of considerable value for allowing proper operation of the demodulator with noisy or otherwise less than perfect digitized video signals and is one of the inventive features of the present disclosure.

The color subcarrier reference is sampled at known times to produce a set of digital or analog samples representative of the subcarrier reference. The set of samples is operated on via digital or analog circuitry so that the sample to sample phase change is processed over a number of samples of burst to give a value which is statistically descriptive of the phase change parameter of the set of color subcarrier reference samples. The processing of sample to sample phase change values is preferred to be integration or averaging. In the present embodiment, the representative value of the sample to sample phase change is utilized by the reference generating circuit to generating the demodulator reference signals which are multiplied by the modulated chroma subcarrier.

As will be realized by one skilled in the art from the present disclosure, several other values which are statistically descriptive of a parameter of the set of samples taken over the burst period may also be used. The set of samples may be just 2, as in the operation of 98e, 98f and 101 of FIG. 5, however it is preferred to use 32 or more such as in FIG. 7. By way of example, any of the various integrals, means, the mode or the median, a quartile, decile, percentile, any of the various deviations, etc. may be suitable for use in particular embodiments which are tailored to achieve specific performance in the presence of specific types of artifacts or degradation. The average has however been found quite preferable for the preferred embodiment, with the integral and median also being envisioned as quite suitable.

One skilled in the art may wish to refer to statistical texts, such as the section on Probability and Statistics from the latest "CRC Standard Mathematical Tables" published by the Chemical Rubber Co. of Cleveland, Ohio 44128 for descriptions of various methods of computing values which are statistically descriptive of sets of samples or values.

Integrating or averaging the sample to sample phase change is relatively easy, in view of the value being the same for each sample. The value is expected to be constant by virtue of the preference that the color subcarrier and sampling frequencies be fixed, though not necessarily harmonically related. The other value which is used by the reference generator circuit 94 of FIG. 7, is the starting phase value 86 which represents the sample phase at the start of each color reference subcarrier burst. This value is used by the reference signal generator as a known value which it must be set to, or checked against to ensure consistent and correct phase of the reference signals which it generates. As with the sample to sample phase change 87, it is desirable to sample the color subcarrier reference at known times to produce a set of samples representative of the subcarrier reference. The set of samples is operated on so that the equivalent sample phase for each sample is integrated or averaged over a number of samples of burst to give a value which is statistically descriptive of the equivalent phase parameter of the set of color subcarrier reference samples. In the present embodiment, the sample to sample phase may in fact change, there being no requirement that the sampling be phase locked to the color subcarrier burst. Averaging or integrating the sample to sample phase over a number of samples therefore becomes somewhat more of a problem than integrating the sample to sample phase change. The circuitry 120 through 124 accomplishes this task, obtaining a value which is representative of an averaged value, but corresponding to the precise noise free value of a particular sample, which is the representative value utilized by the reference generating circuit in generating the demodulator reference signals which are multiplied by the modulated chroma subcarrier.

The accumulator made up of 122 and 124 is held clear by BF 74 until the reference burst samples are present at the output of 98e. The accumulator operates in a modulo 4, requiring 4 register sections in 124, since there are approximately 4 samples taken for each cycle of reference burst. The accumulator therefore accumulates the value of each phase for each one of the 4 samples associated with a color subcarrier cycle. For example, referring to FIG. 6, sample A from the first quadrant is accumulated with the fourth sample, the eighth sample, etc. through sample F, the 32nd sample. In the preferred embodiment which operates with NTSC video, there are approximately 8 cycles of burst, and burst flag (BF) identifies 8 cycles, after 32 samples, 122 will output the accumulated value of the first quadrant samples of the 8 cycles of burst. The accumulated value is divided by 8 in 121 giving the average value of the first quadrant sample over the 8 cycles of burst. It has been presumed by way of example that the A sample lies in the first quadrant, however this is not a requirement, thus the A sample may lie in any quadrant. Additionally, there is no need for the A sample to remain in any given quadrant over the 8 cycles of burst. If in fact there is a frequency difference between the samples and burst such that successive samples are other than 90 degrees apart, the average value output from 121 at the end of the 32 samples will represent the instant value associated with the start of the middle burst cycle, that is the 5th cycle of burst, which is also the 17th sample.

As a quick example, assume that the sample to sample difference corresponds to 95 degrees of subcarrier burst. Assume that sample 17 corresponds to a value representing 0°. The 13th sample will be −5° and the 21st sample will be +5°. The average will be 0°. One skilled in the art will recognize that this average mechanism will operate properly even though the sample frequency is substantially different than precisely 4 times the subcarrier frequency.

Additionally, one skilled in the art will also be able to modify the circuitry from the teachings herein to allow operation with other nominal sampling to subcarrier frequencies. Such modification may be effected by replacing 124 with a tapped shift register where the output tap which is selected to feed the stored value back to 122 is changed in response to the sampling clock to burst frequency. Such selection may be automatic, or under operator control. Automatic selection may be accomplished by counting the average number of burst samples having positive values, and selecting the tap giving twice that number of delay stages. In the preferred embodiment described herein, there are 4 samples per burst cycle, therefore there are two consecutive positive cycles and the tap of 124 would be selected to provide 4 delay stages. This inventive feature will be easily implemented by those skilled in the art using standard logic elements.

Since the output of 121 represents the phase value for the 17th sample, and the value 87 is not available until the 33rd sample is present at the input of 98e, it is desirable to add the accumulated phase change from the 17th to the 33rd sample to the value in 121 in order to arrive at the value for sample 33. This added value is 16 times the sample to sample phase change which conveniently is available at 119. Multiplier 120 multiplies the value from 119 to generate this correction factor, thus providing value 86 from 123. Alternately, the correction value may be derived directly from 126 by simply bit shifting, or from 119 as a second output. It is also possible to eliminate this 123 and 126 operation, since only a static error is picked up by such elimination, and the static error may be removed by adjusting 114.

Additionally, it should be noted that if the sample to sample phase change is expected to always be constant, a fixed value representing 16 times this expected value may be added to the output of 121. Further, if the sample to sample phase change is expected to be constant, this eliminates the need for 125, 118, 119, and 127, and this fixed expected value may be substituted for 87.

Once the value of the sample to sample phase change 87 and the phase of a given sample of the reference burst 86 are arrived at or computed, they are applied to the reference signal generator 94. Reference generator 94 is an accumulator comprised of 107A and 98D where the previous sample phase value 110 is incremented at every clock cycle by 107A (that is 107a adds phase in modulo 360°) by the sample to sample phase change 87. This operation gives the phase of the reference subcarrier signal for each and every sample. At the start of each line containing a new color burst, switch 106 causes the new sample value 86 to be loaded into the accumulator, this action in response to the 32 count signal 109. In order to allow a static phase adjustment to provide for demodulation along a particular axis, and/or to provide for a tint control as is common in the art, an offset phase value 114 is added to the present sample phase by 107b, which is also a modulo 360° adder. The angle value corresponding to the offset reference carrier phase for each sample, which is output from 107B, is then coupled to SIN and COS look up tables (LUT) 111 and 112 which output the value of SIN and COS on 95 and 96 corresponding to the angle of the present sample offset by 114. The values 95 and 96 are those utilized by the demodulator 90 of FIG. 4 and which are multiplied with the color subcarrier to accomplish demodulation.

FIG. 8 shows an alternate embodiment 90' which may operate in digital or analog form but which is preferred to be implemented in digital form, including 90 of FIG. 4 which has cost and performance advantages over the prior art method when utilized with the circuit of FIG. 7. Since it is desired to generate reference subcarrier values to be multiplied with the modulated subcarrier, elements 107B, 111,

112 and the multipliers normally found in 90 with the circuitry of FIG. 8. The φ signal 110 from 98D is applied to LOG SIN and LOG COS look up tables 128 and 129 which output the LOG of the SIN and COS values for each phase value. Since multiplication of signals can be accomplished by adding logarithms, the LOG of the digital chroma subcarrier from 132 is added to the LOG SIN and LOG COS in adders 130A and 130B. The resultant signal which corresponds to the LOG of the demodulated chroma difference signal is converted back to normal and low pass filtered, with $LOG^{-1}$ low pass filters 131a and 131b, thereby providing the filtered color difference signals 92 and 93. Since it is desired to convert the digital chroma to LOG chroma 83' by LOG LUT 132, the operation of computing TANGENT α and α may be simplified to replace divider 99 of FIG. 5 with a subtracter. The circuit which computes α via logarithms is comprised of 98G', 99' and 100' of FIG. 8, which divides the current and past sample values by subtracting the LOG of the samples 83'. The resulting LOG TANGENT value out of 99' is then converted back to α by the ANTILOG, ARCTANGENT look up table 100'. The additional function of ANTILOG which is included in 100' does not increase the size or cost of this element, it merely requires that the PROM be loaded with different data.

FIG. 9 shows the preferred embodiment of $LOG^{-1}$ LPF 131A and 131B of FIG. 8. The LOG of the demodulated chroma difference signal is input at 133, coupled to an antilog LUT 134A, and the inputs of a plurality of coefficient adders 136A through 136N. The coefficient adders add the LOG of the filter tap coefficients 155A– 155N to the log input signal from 134A held in latch 135A, which is equivalent to multiplying the demodulated chroma difference signal by a filter tap coefficient. The outputs of the coefficient adders 136A through 136N are coupled to antilog LUTs 134B through 134N+1 respectively, thus making all of the tap values available for registers 135B through 135N+1 and 138M. The tap values are then shifted and summed as for example by 137A, 138A, and 137N to generate an output signal, as is normally done with digital filters.

Moving to FIG. 10, one skilled in the art will recognize that often the sampling frequency will be constantly changing. Such will be the case when the video signal contains timebase error and the sampling clock phase locked to H. In the case of heterodyne color, the color subcarrier frequency will be relatively constant, but because the sampling frequency is constantly changing in response to timebase error, an error of the generated reference signal will always be present at the next line burst, even if the sample to sample phase value were to be updated correctly for the present line. This situation also exists for PAL signals where the color subcarrier is not exactly a multiple of the video H sync rate. This is commonly referred to as the 25 Hz color subcarrier offset. The problem of having color subcarrier to sampling clock frequency changes can be overcome by predicting the phase error for the next line. The prediction is used for correcting the present sample to sample phase increment value to cause the error which would have been generated to be absorbed over the line on a sample by sample basis.

For example, at the time of a current burst it can be known or predicted that the error of the generated reference will be some value, say 10 degrees, at the next burst. The generation of the reference can be altered to correct the error during the upcoming line by distributing the 10 degree error over all of the upcoming generated samples. The future prediction can be easily achieved by delaying the chroma subcarrier, 83 of FIG. 4, by 1 H at the input of the demodulator 90. Stated another way assume line Y follows line X. The phase error of the generated reference to line X burst is 0. The phase error of the generated reference to the line Y burst is 45°. Assume there are 100 samples per line. The per sample error over line Y is therefore 0.45°. The value 87 corresponding to a sample to sample phase change is then changed by the 0.45° error by the action of 84. Normally this would not occur until after line Y where the error actually took place, however by delaying the line Y chroma subcarrier by one line before decoding, this error will be canceled by the new sample to sample phase value 87. In effect, delaying the chroma subcarrier before decoding is allowing prediction and correction of the phase error before it is used for decoding. This effectively results in frequency modulation of the generated reference.

FIG. 10 shows another embodiment of 97 which may operate in digital or analog form but which is preferred to be implemented in digital form, with the logarithm processing in 84, and with a different accumulator and reference generator configuration for 94 as compared to FIG. 5. Digital chroma 83 is input along with the sample clock on 77 and burst flag on 74. Digital chroma is converted to logs 144 by 138 and the TANGENT taken by 139, 141 and 140 giving the LOG TANGENT φ 142, which is then converted back to φ by 143. One will recognize that this circuit 84 operates in a manner similar to the bottom part of FIG. 8. The sampling angle φ, 86 which is not averaged, is coupled to the A input of subtracter 145. Subtracter 145 calculates the difference between the measured sample phase 86, and the accumulated sample phase from accumulator 107A and 153 which is latched into latch 159 by burst flag. This value A–B represents the error between the accumulator phase value and the measured value, which should be zero if the accumulator is operating properly and the sampling frequency is constant. If however, the sampling frequency is changing, an error is generated by 145. The error A–B is multiplied by a percentage by 146 to give a percentage error 152, which is accumulated during burst by accumulator 147 and 148 via connection 150. Latch 148 is clocked by the gated sample clock 156 from gate 149 which gates the sample clock through during burst flag. At the end of BF, the sample clock is gated off by 149, and the last accumulated sample to sample phase change value 151 is held by 148. During burst flag, switch 160 is caused to input the instant sample phase to 153, in effect resetting the accumulator to zero error.

The percentage in 146 is chosen to be a value which divides the error by the number of samples line to line, times the number of clocks 156. In this fashion, the value 151 will be averaged over the number of values 86 which are calculated during burst flag, and divided by the number of samples per line, thus giving the sample to sample portion of the line to line phase error. Thought of another way, 151 is the sample to sample phase change due to the frequency variation of the sampling clock.

The second accumulator 107a and 153 is clocked continuously, thereby calculating the phase value for each and every sample clock 77 throughout the video line, including the values of the samples of the next burst which occur on the next line of video. When the next line burst sample values are present at A of 145, the error A–B is again measured, and a percentage of that error, if any, is added to the sample to sample phase change value 151 to arrive at a new value if an error was present.

Otherwise, if there is no error, the percentage is 0 and the old value is held in 148. The phase value of each sample from 153 is offset by a static phase 114 in 107b, and coupled to SIN and COS look up tables 111 and 112 to generate the reference signals 95 and 96, as in FIG. 5.

While the present invention has been shown and described by way of example in the preferred embodiment, various other combinations, variations and modifications will readily occur to one skilled in the art from the teachings herein, and may be employed to accomplish various tasks related to demodulating phase modulated signals and generating reference signals without departing from the spirit and scope of the present invention as hereinafter claimed.

What is claimed is:

1. A reference signal generating apparatus for generating a reference signal in response to a sampled carrier reference which is sampled at known sampling times, each having a sampling angle having a tangent, to produce amplitude values comprising;

phase offset means responsive to said amplitude value at each of a plurality of known sampling times for calculating a phase measure value representative of the change in phase of said carrier reference from one of said known times to the next, phase accumulator means operable to provide said reference signal in response to said phase measure value.

2. Apparatus as claimed in claim 1 wherein a sampling means samples the amplitude of said carrier reference in response to a sampling clock to determine said amplitude value with said sampling clock having a frequency which is not harmonically related to said carrier reference by an even integer multiple.

3. Apparatus as claimed in claim 1 wherein said phase offset means determines the tangent of the sampling angle for a given known sampling time by dividing a first said known amplitude value by a second said known amplitude value to provide the tangent of the sampling angle of said given known value which given known value is one of said first or said second known amplitude value.

4. Apparatus as claimed in claim 1 wherein the tangent of the phase of said carrier reference is determined by said phase offset means at a plurality of phase times which are located within a contiguous portion of said carrier reference and wherein said phase offset means includes means for converting said tangents to said phase of said carrier reference, with the difference between said phases of said carrier reference being determined said difference being said phase measure value.

5. Apparatus as claimed in claim 1 wherein said phase accumulator operates to produce successive reference signal values by adding said phase measure value to the previous one of said successive reference signal value to produce a current one of said successive reference signal value.

6. Apparatus as claimed in claim 1 wherein said carrier reference is intermittent in time.

7. Apparatus as claimed in claim 1 wherein said carrier reference is intermittent in time and is sampled with an analog to digital convertor means to provide said amplitude values in digital form, which sampling is performed in demodulated in response to said reference signal.

8. Apparatus as claimed in claim 1, 2, 3, 4, 5, 6, or 7 wherein said carrier reference is a reference burst of a video color subcarrier signal having a length from 6 to 10 cycles and said sampling is performed at other than precisely 90 degree increments thereon.

9. Apparatus as claimed in claim 1, 2, 3, 4, 5, 6, or 7 wherein said carrier reference is contained within a color subcarrier signal of a video signal, and said known sampling times are chosen by a sampling signal generator means in response to the scanning synchronizing portion of said video signal.

10. Apparatus as claimed in claim 1, 2, 3, 4, 5, 6, or 7 wherein said carrier reference is contained within a color subcarrier signal of a video signal, and said known sampling times are chosen by a a sampling signal generator means in response to the scanning synchronizing portion of said video signal, and including in combination a demodulating means responsive to said color subcarrier and said reference signal to provide a demodulated signal.

11. A demodulator apparatus operable for demodulating information content of a modulated carrier, which modulated carrier has an associated carrier reference signal which may be separate therefrom, said demodulating including operating on said modulated carrier in response to at least one demodulator reference signal generated by said demodulator, said apparatus including in combination;

sampling means to sample said carrier reference at a plurality of known times thereby producing a set of a plurality of carrier reference samples, determining means for determining a value which is statistically descriptive of a parameter of said set of carrier reference samples, and generating means responsive to said value for generating said demodulator reference signal.

12. A demodulator apparatus as in claim 11, wherein the carrier reference signal is continuously present at said apparatus.

13. A demodulator apparatus as in claim 11, wherein the carrier reference signal is intermittently present at said apparatus with said sampling of said carrier reference occurring at a frequency which is not harmonically related to said carrier reference by an even integer multiple.

14. A demodulator apparatus as in claim 11, wherein the carrier reference signal is time multiplexed with said modulated carrier signal which said sampling of said carrier reference is at a frequency which is not harmonically related to said carrier reference by an even integer multiple.

15. A demodulator apparatus as in claim 11, wherein the sampling means is responsive to a sampling clock to perform said sampling, which sampling clock has a known phase relationship to the scanning synchronizing portion present in the signal which contains said modulated carrier.

16. A demodulator apparatus as in claim 11, wherein said generating means generates a plurality of demodulator reference signals which have a known phase relationship.

17. A demodulator apparatus as in claim 11, wherein said sampling means is responsive to a sampling clock to perform said sampling, which sampling clock has a known phase relationship to the scanning synchronizing portion present in the signal which contains said modulated carrier, which sampling means provides at least three samples of said carrier reference as said set, with said determining means combining said samples as part of determining said statistically representative value.

18. A demodulator apparatus as in claim 11, including a demodulating means wherein said information content of said modulated carrier is at least partially recovered by adding a value representative of the logarithm of said modulated carrier to a value representing the logarithm of said demodulator reference signal, and further by converting the sum of such addition to a value representing the antilog of said sum, said antilog representing said recovered information content.

19. A demodulator apparatus as claimed in claim 11, 13, 14, 15, 16, or 17 wherein said modulated carrier is a video chroma subcarrier of a video signal, and said carrier reference is the color burst signal time multiplexed with said video chroma subcarrier with said sampling means responsive to a sampling clock to sample said color burst signal at a plurality of known times in response to said sampling clock, said apparatus further comprising, a sampling clock generating means responsive to scanning synchronizing portions of said video signal to produce said sampling clock at a frequency which is a multiple of said synchronizing portions of said video signal, said apparatus still further comprising demodulator means responsive to said demodulator reference signal and said video chroma subcarrier to produce at least part of said information content of said chroma subcarrier.

20. A demodulator apparatus operable for demodulating chroma difference signals of a video chroma subcarrier, which chroma subcarrier has an associated subcarrier burst reference signal time multiplexed therein, said demodulating including multiplying means for multiplying said chroma subcarrier with a plurality of demodulator reference signals generated by a reference signal means, said apparatus including;

sampling means to sample said subcarrier burst reference signal at a plurality of known times thereby producing a set of a plurality of subcarrier burst reference samples, selecting means for selecting a descriptive value which is statistically descriptive of a parameter of said set of subcarrier burst reference samples, and with said reference signal means responsive to said descriptive value for generating said demodulator reference signals.

21. A demodulator apparatus as in claim 20 wherein said descriptive value is representative of the sample to sample phase change of said subcarrier burst reference signal.

22. A demodulator apparatus as in claim 20 wherein said descriptive value is representative of a mean of a plurality of sample to sample phase changes of said subcarrier burst reference signal.

23. A demodulator apparatus as in claim 20 wherein said statistically descriptive value is representative of a median of a plurality of sample to sample phase changes of said subcarrier burst reference signal.

24. A demodulator apparatus as in claim 20, wherein said demodulator means includes means for adding a value representative of the logarithm of said chroma subcarrier to each of the values representing the logarithms of said demodulator reference signals, and further converting the sums of such additions to values representing the antilog of said sums, said antilog values representing said demodulated chroma difference signals.

25. A demodulator apparatus as in claim 20, 21, 22, 23 or 24, wherein said sampling means also samples said video chroma subcarrier to provide a set of chroma samples, and said reference signal means includes means for generating a reference phase value for each of said chroma samples, and further including means responsive to said reference phase value to provide said plurality of demodulator reference signals.

26. A demodulator apparatus as in claim 20, 21, 22, 23 or 24, wherein said sampling means also samples said video chroma subcarrier to provide a set of chroma samples, and said reference signal means includes means for generating a reference phase value for each of said chroma samples, said apparatus further including, means responsive to said reference phase value to provide said plurality of demodulator reference signal values for each said chroma sample, which chroma samples are multiplied in said multiplying means by each of said plurality of demodulator reference signal values to provide said chroma difference signals, said apparatus further operative such that said sampling means performs said sampling at a rate responsive to the synchronizing portions of said video signal.

27. The method of generating a decoding reference signal phase locked to a carrier reference signal, including the steps of;

sampling the carrier reference signal to produce a set of samples, finding a phase increment value representative of the change of phase of said carrier reference signal from one sample to the next, setting said decoding reference signal to a known phase value, incrementing said known phase value of said decoding reference by the amount of said phase increment value.

28. The method of claim 27 including the steps of determining the carrier reference signal phase corresponding to a given sample, comparing said carrier reference signal phase to said decoding reference phase corresponding to said given sample, and if said values are not in agreement, modifying said increment value in response to the amount of difference therein.

29. The method of claim 27 including the steps of determining the carrier reference signal phase corresponding to a given sample, comparing said carrier reference signal phase to said decoding reference phase corresponding to said given sample, and if said values are not in agreement, modifying said decoding reference phase value in response to the amount of difference therein.

30. The method of claim 27 including the steps of determining the carrier reference signal phase corresponding to a given sample, comparing said carrier reference signal phase to said decoding reference phase corresponding to said given sample, and if said values are not in agreement, modifying said increment value and said decoding reference phase value in response to the amount of difference therein.

31. The method of claim 27 including the steps of determining the carrier reference signal phase corresponding to a given sample and, periodically modifying said decoding reference phase value corresponding to said given sample to change it to said carrier reference signal phase value.

32. The method of generating a decoding reference signal phase locked to a carrier reference signal, including the steps of;

sampling the carrier reference signal to produce a set of samples, computing a phase increment value representative of a mean value of the change of phase of said carrier reference signal from one sample to the next, incrementing the phase value of said decoding reference by an amount responsive to said phase increment value.

33. The method of claim 32 including the steps of determining the carrier reference signal phase corresponding to a given sample, comparing said carrier reference signal phase to said decoding reference phase corresponding to said given sample and, if said values are not in agreement, modifying said increment value in response to the amount of difference therein.

34. The method of claim 32 including the steps of determining the carrier reference signal phase corresponding to a given sample,
   comparing said carrier reference signal phase to said decoding reference phase corresponding to said given sample and,
   if said values are not in agreement, modifying said decoding reference phase value in response to the amount of difference therein.

35. The method of claim 32 including the steps of determining the carrier reference signal phase corresponding to a given sample,
   comparing said carrier reference signal phase to said decoding reference phase corresponding to said given sample and,
   if said values are not in agreement, modifying said increment value and said decoding reference phase value in response to the amount of difference therein.

36. The method of claim 32 including the steps of determining the carrier reference signal phase corresponding to a given sample and,
   periodically modifying said decoding reference phase value corresponding to said given sample to change it to said carrier reference signal phase value.

37. The method of claim 32 wherein the step of sampling is in response to a sampling clock which is continuous throughout the duration of the signal which is to be decoded and,
   where the step of incrementing the phase value of said decoding reference is achieved by adding said mean value to the past phase value to arrive at the new phase value in response to each sampling clock pulse.

38. The method of claim 32 wherein the step of sampling is in response to a sampling clock which is continuous throughout the duration of the signal which is to be decoded, including the further step of generating said sampling clock in response to a portion of synchronizing information which is present on said signal which is to be decoded.

39. The method of determining the sample to sample change of the phase of a sampled carrier reference including the steps of;
   sampling said carrier reference to produce said samples,
   determining the phase value of a first known sample from a known slope half cycle of said carrier reference,
   determining the phase value of a second known sample from a known slope half cycle of said carrier reference,
   determining the phase change of the carrier occurring from said first known sample and said second known sample,
   dividing said phase change by one more than the number of samples which occurred between said first known sample and said second known sample, said result being said sample to sample phase change.

40. The method of determining the sample to sample change of the phase of a sampled carrier reference including the steps of;
   sampling said carrier reference to produce said samples,
   determining the phase value of a first known sample from a known slope half cycle of said carrier reference,
   determining the phase value of a second known sample from a known slope half cycle of said carrier reference,
   determining the phase change of the carrier occurring from said first known sample and said second known sample,
   dividing said phase change by one more than the number of samples which occurred between said first known sample and said second known sample,
   obtaining said result number of times providing a set of results,
   determining a statistically representative value for said set, said statistically representative value being said sample to sample phase change.

41. The method of decoding a color video signal to recover the color difference signals modulated on a color subcarrier therein, including the steps of;
   generating a sampling clock phase locked to horizontal sync pulses of said color video signal,
   sampling said color video signal with an analog to digital convertor thereby producing digital samples thereof,
   filtering the color subcarrier out of the said digital samples thereby producing color samples,
   producing a burst flag in response to said horizontal sync pulses,
   computing a statistical representative value of the change of phase of the color burst from sample to sample in response to said color samples and said burst flag,
   generating a reference phase signal from a phase accumulator,
   incrementing the phase of said reference phase signal by the amount of said statistical representative value of the change of phase for each clock of said sampling clock,
   offsetting the value of said reference phase by a known amount,
   generating the sine and cosine values corresponding to the value of said reference phase at each new value thereof,
   multiplying each of said chroma samples by said sine value and by said cosine value thereby producing unfiltered color difference signals, and
   filtering said unfiltered color difference signals to produce said color difference signals.

42. The method of generating a reference subcarrier signal in response to a color video signal, including the steps of:
   generating a sampling clock and in response thereto sampling said color video signal and with an analog to digital convertor thereby producing digital samples thereof;
   providing color burst samples from said digital samples in response to the color subcarrier burst;
   generating a burst flag in response to predetermined synchronizing pulses of said color video signal;
   in response to said color burst samples and said burst flag, generating a sample phase value which is statistically representative of the change of phase of the color subcarrier burst from sample to sample;
   in response to said sample phase value, generating a reference phase signal in a reference generator, for at least some of said sampling clock, said reference generator operative to increment the phase of said reference phase signal by an amount which is directly responsive to said sample phase value thus producing a data stream of reference phase signal values;
   generating at least one corresponding sine value data stream in response to said reference phase signal value data stream, said data stream of said sine values representing said reference subcarrier signal.

43. In a system operating with a digitized version of an analog signal, said system including an increment clock signal and a series of digital samples having values representative of said analog signal at the instant of taking each of said samples, said system further including reference samples having values representative of a non continuous reference signal portion of said analog signal, an apparatus for generating a series of reference values in response to said reference samples, said apparatus including:

- a phase increment measure circuit responsive to said values of a plurality of said reference samples to provide a phase value responsive to the phase change of said non continuous reference signal portion over a given number of said burst samples,
- a reference generator circuit responsive to said phase value and said increment clock signal which reference generator circuit provides an output signal the value of which increments in response to said increment clock signal in steps the size of which is responsive to said phase value,
- a reference value circuit responsive to the output of said reference generator circuit to provide said reference values.

44. An apparatus as claimed in claim 43 wherein said phase increment measure circuit compares the sampling phase of one said reference sample with respect to the sampling phase of another said reference sample to determine the total non continuous reference signal portion phase change therebetween and a dividing circuit operative to divide the resulting difference by the number of sample periods therebetween thus providing said phase value.

45. An apparatus as claimed in claim 43 wherein said phase increment measure circuit subtracts the sampling phase of one said reference samples from the sampling phase of another said reference sample to determine the total non continuous reference signal portion phase change therebetween, and performs a plurality of said subtractions for a plurality of said reference samples, and further includes an average circuit which averages the results of said plurality of subtractions to provide said phase value.

46. An apparatus as claimed in claim 43, 44 or 45 including a phase setting circuit responsive to one or more of said reference samples and one or more of said reference values corresponding thereto to produce an error signal representative of the error therebetween, with said reference generator circuit responsive to said error signal to reduce said error by altering said step size.

47. An apparatus as claimed in claim 43, 44 or 45 including a phase setting means responsive to at least one selected said reference sample to produce a selected sampling phase signal therefrom, with said reference generator circuit responsive to said selected sampling phase signal to alter said phase value output therefrom in order that said reference value matches correspondingly to said selected reference sample.

\* \* \* \* \*